(12) United States Patent
Golan

(10) Patent No.: US 11,027,785 B1
(45) Date of Patent: Jun. 8, 2021

(54) AERODYNAMIC ENGINEERING VEHICLE APPARATUS

(71) Applicant: Snir Golan, Yokneam Ilit (IL)

(72) Inventor: Snir Golan, Yokneam Ilit (IL)

( * ) Notice: Subject to any disclaimer, the term of this patent is extended or adjusted under 35 U.S.C. 154(b) by 0 days.

(21) Appl. No.: 17/248,684

(22) Filed: Feb. 3, 2021

(51) Int. Cl.
  *B62D 35/00* (2006.01)
  *B62D 37/02* (2006.01)
  *B62D 25/12* (2006.01)

(52) U.S. Cl.
  CPC ............ *B62D 37/02* (2013.01); *B62D 25/12* (2013.01); *B62D 35/00* (2013.01)

(58) Field of Classification Search
  CPC .... B62D 35/00; B62D 35/005; B62D 35/008; B62D 35/02; B62D 37/02; B62D 25/10; B62D 25/105; B62D 25/12
  USPC ............................................ 296/180.1, 180.5
  See application file for complete search history.

(56) References Cited

U.S. PATENT DOCUMENTS

| | | | | |
|---|---|---|---|---|
| 2,037,942 A * | 4/1936 | Stalker | ................. | B62D 35/007 180/89.1 |
| 2,913,065 A * | 11/1959 | Lyon, Jr. | ................. | B60K 11/04 180/68.1 |
| 4,384,630 A | 5/1983 | Steiner | | |
| 4,673,206 A * | 6/1987 | Kretschmer | ........... | B60K 11/08 296/180.1 |
| 4,917,434 A * | 4/1990 | Sumitani | ................ | B62D 37/02 105/1.2 |
| 5,184,832 A * | 2/1993 | Miwa | ................... | B62D 35/005 296/198 |
| 5,617,608 A * | 4/1997 | Primlani | ................... | B60S 1/54 15/250.001 |
| 8,479,853 B2 | 7/2013 | Verbrugge | | |
| 10,351,181 B2 | 7/2019 | McKillen et al. | | |
| 10,577,034 B2 * | 3/2020 | Thompson | ............. | B60K 11/04 |
| 2001/0011825 A1 * | 8/2001 | de Vega | ................. | B62D 35/00 290/55 |
| 2002/0153178 A1 * | 10/2002 | Limonius | .................. | F03D 9/25 180/2.2 |
| 2006/0238001 A1 * | 10/2006 | Konermann | ......... | B62D 29/008 296/205 |
| 2008/0252099 A1 * | 10/2008 | Terry | .................... | B62D 35/02 296/181.5 |

(Continued)

*Primary Examiner* — Gregory A Blankenship
(74) *Attorney, Agent, or Firm* — Haim M. Factor—1st-Tech-Ideas

(57) ABSTRACT

In a vehicle having an incoming wind entering a central air main inlet and two front-side air opening inlets, and exiting respectively as a hood air opening outlet air flow and two lateral-wheel outlet flows, an apparatus to affect airflow and to enhance vehicle performance, the apparatus having: at least one outlet air flow-enhancing device configured to modify the hood air outlet opening and the two lateral-wheel outlet flows, the at least one outlet air flow enhancing device having an x-axis, a y-axis, and a z-axis, the axes mutually orthogonally oriented; and a mechanical fixture of the at least one outlet air flow-enhancing device to the vehicle, the mechanical fixture having movable supports configured to allow changes in attitude and positioning of the at least one outlet air flow enhancing device; wherein the hood air outlet opening and the two lateral-wheel outlet flows are affected by aerodynamic changes to the vehicle by not directly affecting changes in the exterior contours and shape of the vehicle.

15 Claims, 4 Drawing Sheets

(56) References Cited

U.S. PATENT DOCUMENTS

| | | | |
|---|---|---|---|
| 2012/0292122 A1* | 11/2012 | Verbrugge | B60K 11/085 180/68.4 |
| 2013/0168999 A1* | 7/2013 | Hitchcock | B62D 35/00 296/180.1 |
| 2015/0321547 A1 | 11/2015 | Richard | |
| 2015/0345578 A1* | 12/2015 | Nightingale | B62D 35/008 188/264 AA |
| 2016/0176385 A1* | 6/2016 | Wolf | F16D 65/847 296/208 |
| 2016/0272257 A1* | 9/2016 | McKillen | B60K 11/08 |
| 2017/0082092 A1* | 3/2017 | Gaither | B60L 3/0076 |
| 2017/0240226 A1* | 8/2017 | Brooks | B62D 35/007 |
| 2018/0086201 A1* | 3/2018 | Antrobus | B60L 53/11 |
| 2018/0162458 A1* | 6/2018 | McMillan | B62D 35/008 |
| 2019/0233022 A1 | 8/2019 | Biancalana | |
| 2020/0056682 A1* | 2/2020 | Paul | B62D 35/007 |

\* cited by examiner

View A-A

US 11,027,785 B1

AERODYNAMIC ENGINEERING VEHICLE APPARATUS

FIELD OF INVENTION AND BACKGROUND

Embodiments of the current invention relate to automotive performance and energy conservation and specifically to an aerodynamic engineering automobile apparatus.

During the history of motorcar development, automobile and vehicle manufacturers have developed aerodynamically improved designs. Such improvements have included shortened leading/front aspects of vehicle for the simple purpose of minimizing excessive wind resistance—which generally serves to slow the vehicle. (In racing vehicles, this design approach has been advanced even further due to performance considerations.) In the claims and specification which follow, the term "wind" is intended to mean the effective air flow towards and against the vehicle as it travels forward on a road surface.

In recent years, vehicle manufacturers have begun to include vehicle designs having an air main inlet, located at the forwardmost part of the vehicle and a hood air outlet opening. The air main inlet allows air to enter and to exit at the hood air outlet, thereby giving a design effect resembling as much as possible of an arrow, without impacting a classical design that consumers prefer. There are high performance vehicles having a rear-mounted engine, thereby more easily enabling the air flow configuration described hereinabove. Similar aerodynamic-improving openings can be typically found beneath the front headlamps in some vehicles—as described hereinbelow—thereby further improving aerodynamic performance of the vehicle.

Figure 1:
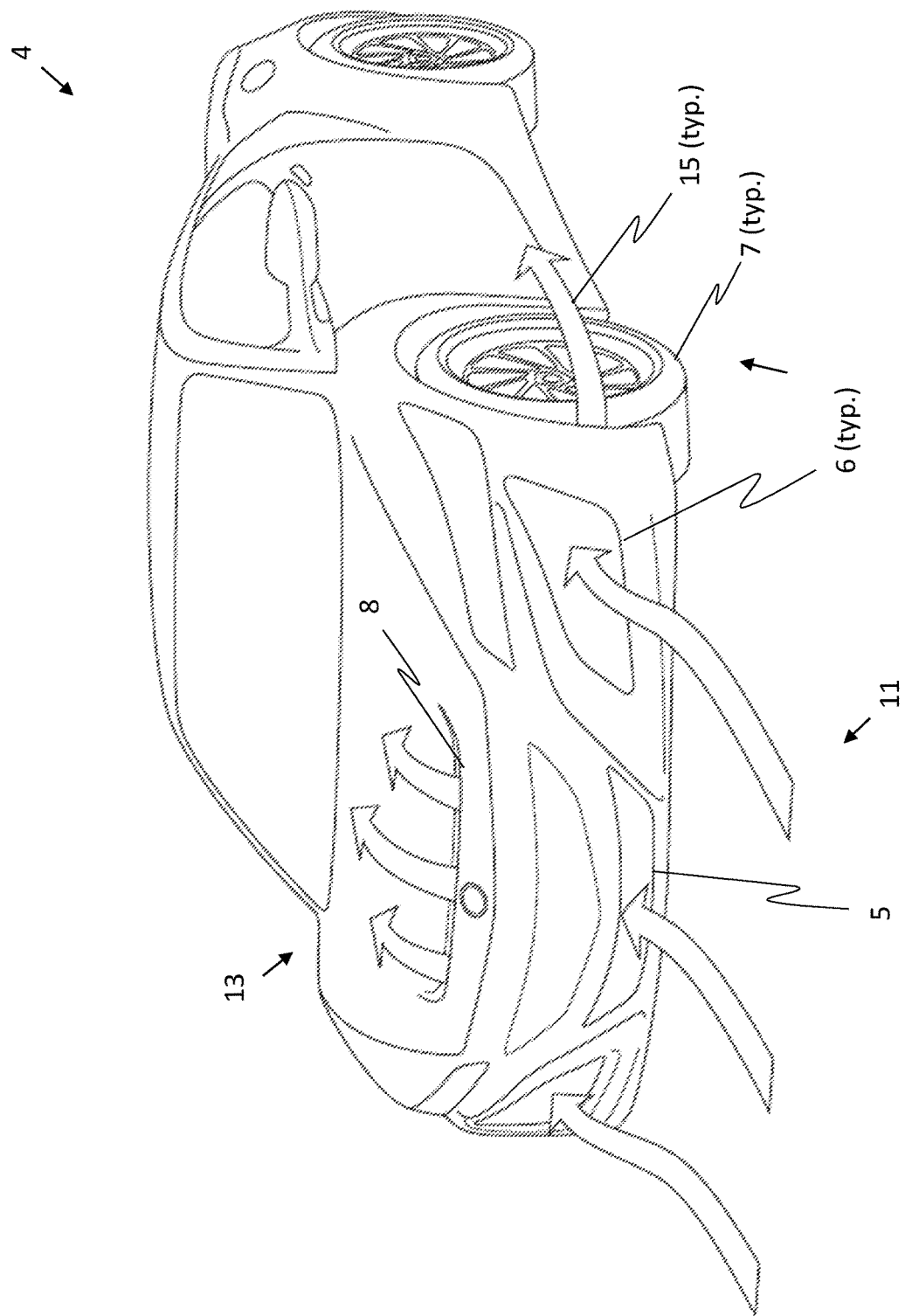

Reference is currently made to FIG. 1, which is a representation of a prior art high-performance vehicle 4, having: a central air main inlet 5; two front-side air opening inlets 6; wheels 7; and an exemplary hood air outlet opening 8. As vehicle 4 travels forward, a wind 11 enters central air main inlet 5 and two front-side air opening inlets 6 (i.e. "incoming wind") with the wind exiting respectively, as a hood air opening outlet air flow 13 and two lateral-wheel outlet flows 15 (on respective right and left sides of vehicle 4)—all as known in the art. Wind 11 entering the central air main inlet and respective hood air opening outlet air flow 13 and two lateral-wheel outlet flows 15 are characteristic of vehicles similar to vehicle 4 and are to be understood as present in the figure which follows hereinbelow.

In the prior art, various structures have been provided to affect turbulence and air resistance to vehicle movement—none of which have been completely satisfactory. Exemplary prior art dealing with such aerodynamic performance includes:

US Patent Application no. 20150321547, whose disclosure is incorporated by reference, in which Richard describes a motor vehicle, which includes a vehicle front having a front end provided with an air inlet in communication with an air duct. A front hood having an air outlet is in communication with the air duct and includes an adjustment member configured for movement to a closing position in which the air outlet is closed.

Verbrugge, in U.S. Pat. No. 8,479,853, whose disclosure is incorporated by reference, describes a system for controlling a flow rate of an airstream through a compartment, which includes a panel configured to cover the compartment. The system also includes a first opening defined by the compartment and configured to permit the airstream to enter the covered compartment from the ambient when the compartment is covered by the panel. The system also includes a second opening defined by the panel and configured to permit at least a portion of the airstream to exit the covered compartment to the ambient. The system additionally includes a selectable position shutter assembly configured to control the size of the second opening and adjust a flow rate of the airstream through the covered compartment. A vehicle employing the shutter assembly to vary a flow rate of at least a portion of an airstream through the vehicle's under-hood area is also disclosed.

U.S. Pat. No. 10,351,181, whose disclosure is incorporated by reference, in which McKillen et al. describe an aerodynamic system for a vehicle having a plurality of heat exchangers can include a front assembly, a pair of front fenders, a hood, a ducting assembly, and a rear assembly. The front assembly can include air inlets. The air inlets can be in fluid communication with at least one of the heat exchangers. The pair of front fenders can include fender outlets in fluid communication with at least one of the heat exchangers. The ducting assembly can be in fluid communication with at least one of the plurality of heat exchangers. The rear assembly can include raised C-pillars, air inlets adjacent the pair of raised C-pillars, a rear spoiler, a rear diffuser, and rear slot assemblies adjacent the rear spoiler.

Biancalana, in US Patent Application no. 20190233022, whose disclosure is incorporated by reference, describes a car comprising a pair of front wheels, a pair of rear wheels, an outer body having a front hood and a front bumper, and a passenger compartment formed inside the outer body between the front and the rear wheels and frontally delimited by a windscreen connected with the front hood; the car being also provided with: an aerodynamic duct extending between an inlet opening formed through the front bumper and an outlet opening formed through the front hood to allow an ascending air flow during the travel of the car; and a wing-shaped profile positioned at the inlet opening and configured to increase the air suction effect by means of the duct during the travel of the car and to increase the front aerodynamic load on the car by acting as a spoiler.

U.S. Pat. No. 4,384,630, whose disclosure is incorporated by reference, in which Steiner describes A duct system is disclosed for increasing the efficiency of a vehicle by decreasing the air resistance of the vehicle. The system utilizes a ducting system with a cowling at the front end and the back to equalize air pressure and to decrease turbulence in areas surrounding the vehicle. An engine driven fan provides air flow to equalize the air pressure in the ducts.

A road-going vehicle can be designed to be as aerodynamically efficient as possible while also meeting other standards not required of racing cars. However, enhancing or maximizing aerodynamic performance for a road-going vehicle can adversely impact the aesthetic appeal of the road-going vehicle. Further, aerodynamic drag increases with increasing aerodynamic downforce (as known in the art) and aerodynamic drag can increase fuel consumption of the road-going vehicle. In addition, airflow requirements for at least one system and/or component (such as, but not limited to a heat exchanger) of a road-going vehicle while travelling at relatively low speeds can outweigh any advantage obtained from aerodynamic downforce.

Thus, it can be challenging to design a high-performance vehicle for stop-and-go traffic driving and for adequate performance on a closed-circuit racing course—while also providing an appropriate level of safety and aesthetic appeal.

It is beneficial to engineer aerodynamic improvements that address at least one of the above and/or other disadvantages of the prior art. In particular, it is beneficial to provide active aerodynamic components to affect airflow and to enhance vehicle performance, inter alia.

There is therefore a need to actively enhance energy efficiency and functionality of high-performance and conventional road-going vehicles by affecting aerodynamic changes either in a retrofit mode and/or by not directly changing vehicle exterior contours and shape.

SUMMARY OF THE INVENTION

According to one aspect of the present invention, in a vehicle having exterior contours and shape and an incoming wind entering a central air main inlet and two front-side air opening inlets, and exiting respectively as a hood air opening outlet air flow and two lateral-wheel outlet flows, an engineering apparatus to affect airflow and to enhance vehicle performance, the apparatus having: at least one outlet air flow-enhancing device configured to enhance and modify the hood air outlet opening and the two lateral-wheel outlet flows, the at least one outlet air flow enhancing device having an x-axis, a y-axis, and a z-axis, the axes mutually orthogonally oriented; and a mechanical fixture of the at least one outlet air flow-enhancing device to the vehicle, the mechanical fixture having movable supports configured to allow changes in attitude and positioning of the at least one outlet air flow enhancing device; wherein the hood air outlet opening and the two lateral-wheel outlet flows are affected by aerodynamic changes to the vehicle by not directly affecting changes in the exterior contours and shape of the vehicle. Preferably, the at least one outlet air flow-enhancing device has an air-turbine configuration with a front end and a rear end. Most preferably, the wind enters the front end and is thrust out of the rear end, substantially coaxially with the x-axis. Typically, the at least one outlet air flow-enhancing device is powered electrically. Most typically, an estimated preferred weight of the outlet air flow-enhancing device ranges from 22 to 27 kilograms.

Preferably, the at least one outlet air flow enhancing device includes a drive shaft connected to and configured to drive a propeller, the drive shaft mechanically connected and driven by a drive gear apparatus, supported by and rotated upon a support shaft. Most preferably, the drive gear apparatus is driven by a front wheel drive system, which includes: a front wheel axle drive and support shaft; at least one front wheel drive gear apparatus driven by the front wheel axle drive and support shaft; a drive belt driven by the front wheel axle drive and support shaft; and a forward gear apparatus driven by the drive belt Typically, the drive belt is a belt, fabricated from a combination of fiber and strong, flexible material and the drive belt has a reinforced chain structure. Most typically, the drive belt is configured to transfer rotational movement of the front wheel gear apparatus to rotate the forward gear apparatus.

Preferably, the forward gear apparatus is configured to mesh and to drive the drive gear apparatus, thereby providing rotational movement of the propellor. Most preferably, a forward support system is mounted mechanically to the vehicle, the forward support system including: a forward horizontal support shaft; and at least one forward "T" coupling configured to support the drive gear apparatus. Most preferably, the forward horizontal support shaft is further configured to mechanically support the forward gear apparatus. Typically, at least one additional outlet air flow enhancing device is configured to be driven by the forward gear apparatus. Most typically, an estimated preferred weight of the outlet air flow-enhancing device ranges from 22 to 27 kilograms.

LIST OF DRAWINGS

Figure 2:
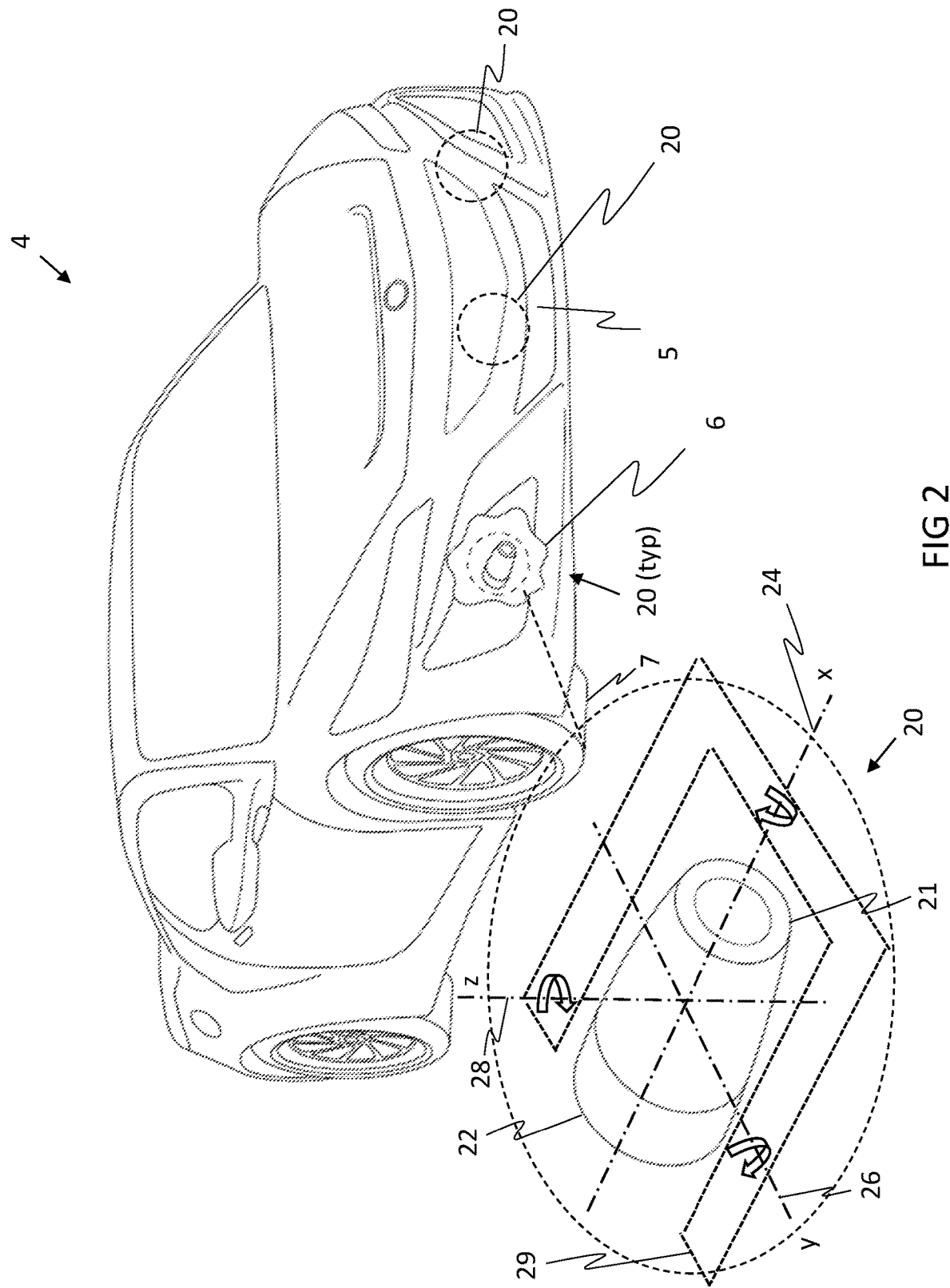
Figure 3:
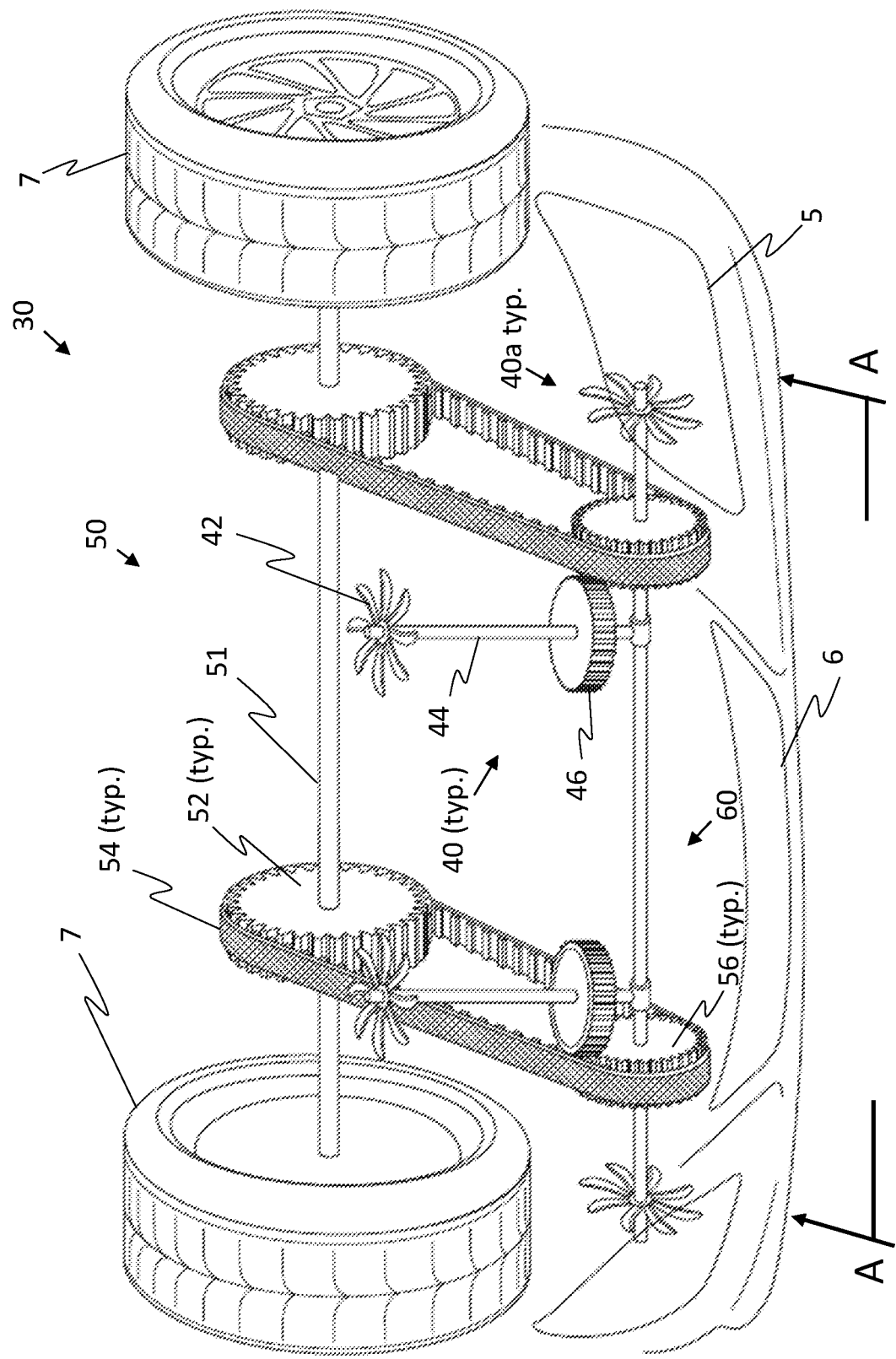
Figure 4:
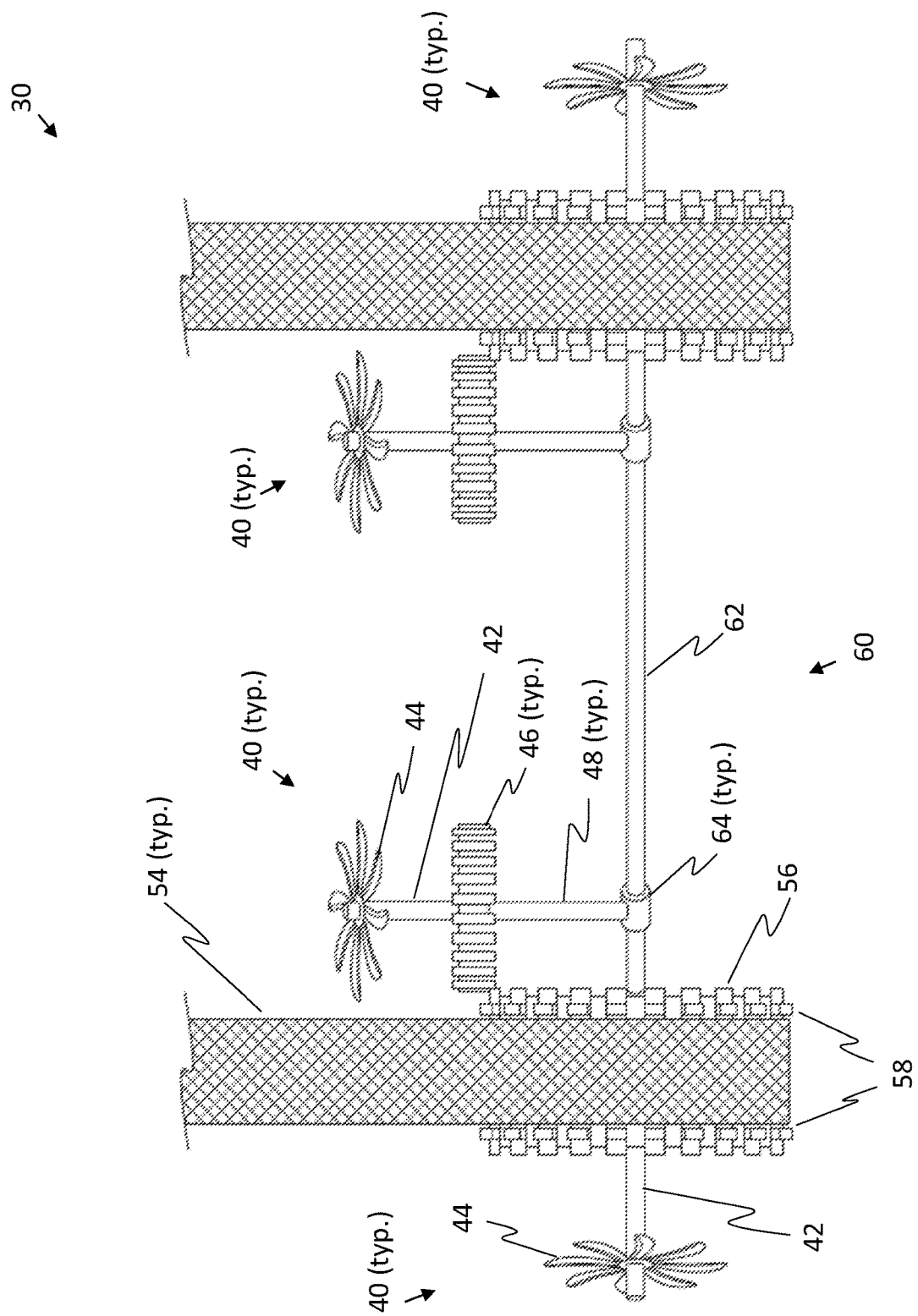

The invention is described herein, by way of example only, with reference to the accompanying drawings, wherein:

FIG. 1 is a representation of a prior art high-performance vehicle having: a central air main inlet; two front-side air opening inlets; wheels; and an exemplary hood air outlet opening;

FIG. 2 is a representation of the vehicle of FIG. 1 having at least one outlet air flow-enhancing device positioned therein, in accordance with embodiments of the current invention; and FIGS. 3 and 4 are a representation of an air flow-enhancing system of the vehicle of FIG. 2, the system having at least one outlet air flow-enhancing device positioned therein, and a frontal elevational detailed view of the air flow-enhancing system, in accordance with embodiments of the current invention.

DETAILED DESCRIPTION

Embodiments of the current invention relate to automotive performance and energy conservation and specifically to an aerodynamic engineering automobile apparatus.

Reference is currently made to FIG. 2, which is a representation of the vehicle of FIG. 1 having at least one outlet air flow-enhancing device 20 positioned therein, in accordance with embodiments of the current invention. Apart from differences described below, vehicle 4, central air main inlet 5; two front-side air opening inlets 6; wheels 7; and exemplary hood air outlet opening 8 of FIG. 2 are identical in notation, configuration, and functionality as described in FIG. 1 hereinabove.

Although not shown in the present figure for purposes of clarity, wind 11 entering the central air main inlet and respective hood air outlet opening outlet air flow 13 and two lateral-wheel outlet flows 15—both as shown in FIG. 1—are understood to be applicable to the current figure.

An objective of embodiments of the current invention is to employ at least one outlet air flow-enhancing device 20 to enhance and modify the hood air outlet opening outlet and the two lateral-wheel outlet flows to afford less resistance and/or enhance vehicle performance—as described hereinbelow.

In embodiments of the current invention, vehicle 4 typically has at least one outlet air flow-enhancing device 20 positioned at or within central air main inlet 5 and at or within two front-side air opening inlets 6—as indicated in the current figure by the dotted-line circles.

A weight of the outlet air flow-enhancing device is determined by the manufacturer. Taking into account an exemplary specific gravity of aluminum of 2.7 g/cc and assuming a representative volume of the air flow-enhancing device ranging from 7,000 to 9,000 cubic centimeters. Allowing for an additional 3 kg of weight of other, heavier material; an estimated preferred weight of the outlet air flow-enhancing device ranges from 22 to 27 kilograms. The use of alternative, more advanced materials can contribute to reducing the weight of the outlet air flow-enhancing device to under 20 kg. The outlet air flow-enhancing device is powered by the vehicle, either directly (mechanically) or indirectly (electrically), as described hereinbelow. In the configuration shown in the current figure, the outlet air flow-enhancing device 20 serves to enhance lateral-wheel outlet flow 15 (ref FIG. 1) and the device is powered electrically.

In an embodiment of the current invention, outlet air flow-enhancing device 20 has an air-turbine configuration (having a characteristic shape, as shown in the figure) with a front end 21 and a rear end 22, and an x-axis 24, a y-axis 26, and a z-axis 28, the axes mutually orthogonally oriented, as shown in the figure. Wind 11 enters front end 21 and is thrust out of rear end 22 of the air-flowing enhancing device, substantially coaxially with the x-axis, as known in the art. The air flow-enhancing device 20 is thereby configured to mitigate resistance to incoming wind 11 and to redirect/accelerated exiting wind from the vehicle as the respective hood air outlet opening and two lateral-wheel outlet flows.

In embodiments of the current invention, outlet air flow-enhancing device 20 is mechanically fixed to vehicle 4, shown schematically in the referenced figure by a mechanical fixture 29, which may be mounted with movable supports and/or gimbals to allow changes in attitude/positioning of the air flow-enhancing device by one or more rotations about respective x, y, and z axes, as indicated in the figure. Changing attitude/positioning enables optimal operation of air flow-enhancing device 20, as described hereinabove.

Reference is currently made to FIGS. 3 and 4, which are a representation of an air flow-enhancing system 30 of the vehicle of FIG. 2, the system having at least one outlet air flow-enhancing device 40 positioned therein, and a frontal elevational detailed view of the air flow-enhancing system 30, in accordance with embodiments of the current invention.

Apart from differences described below, vehicle 4, central air main inlet 5; two front-side air opening inlets 6; and wheels 7 of FIG. 2 are identical in notation, configuration, and functionality as described in FIGS. 1 and 2 hereinabove. In embodiments of the current invention, air flow-enhancing device 40 is powered mechanically from the vehicle, as shown in the referenced figures and as described hereinbelow.

Outlet air flow-enhancing device 40 includes: a drive shaft 42, connected to and driving a propellor 44. Drive shaft 42 is mechanically connected and driven by a drive gear apparatus 46, which rotates upon and is supported by a support shaft 48. Support shaft 48 is further supported as described hereinbelow. Drive gear apparatus 46 is schematically represented in the current figure as a gear wheel; however, embodiments of the current invention include one or more gear wheels, configured in a typical gear box, serving to modify rotational speed and torque, as known in the art. Propeller 44 is driven as described further hereinbelow.

Drive gear apparatus 46 is driven by a front wheel drive system 50, which includes: a front wheel axle drive and support shaft 51; at least one front wheel drive gear apparatus 52, driven by the front wheel axle drive and support shaft; a drive belt 54; and a forward gear apparatus 56, driven by the drive belt, which is driven by the front wheel drive gear apparatus. Drive belt 54 may take the form of a belt, fabricated from any combination of fiber and strong, flexible material, or it may take the form of a reinforced chain structure—both as known in the art.

Front wheel drive gear apparatus 52 and forward gear apparatus 56 are schematically represented in the current figure as gear wheels; however, embodiments of the current invention include one or more gear wheels, configured in typical gear boxes, serving to modify rotational speed and torque, as known in the art. Drive belt 54 serves to transfer rotational movement of front wheel drive gear apparatus 52 to rotate forward gear apparatus 56.

Forward gear apparatus 56 is configured to mesh and to drive gear apparatus 46, thereby providing rotational movement of the propellor. As can be seen in FIG. 4, forward gear apparatus 56 has lateral retention guides 58 therein to ensure and maintain drive belt 54 in position on the forward gear apparatus.

A forward support system 60 completes air flow-enhancing system 30, the forward support system serving to support and transfer rotational movement of the elements described hereinabove to the at least one outlet air flow-enhancing device. Forward support system is mounted mechanically to vehicle 4 (FIGS. 1 and 2) and includes: a forward horizontal support shaft 62; and at least one forward "T" coupling 64, serving to support drive gear apparatus 46. Forward horizontal support shaft further serves to mechanically support forward gear apparatus 56. At least one additional outlet air flow-enhancing device 40a is configured as shown, namely with drive shaft 42 connected to and driven by forward gear apparatus 56. Rotational movement imparted on drive shaft 42 serves to rotate propeller 44, as described hereinabove.

In the configuration shown in FIGS. 3 and 4, four outlet air flow-enhancing devices are shown, with two centrally located and vertically-configured outlet air flow-enhancing devices 40 serving to direct air flow from central air main inlet 5 to hood air outlet opening 8 and with two laterally located and horizontally-configured outlet air flow-enhancing devices 40 serving to direct air flow from two front-side air opening inlets 6 towards wheels 7. The outlet air flow-enhancing devices are operated to redirect/accelerated exiting wind from the vehicle as the respective hood air outlet opening and two lateral-wheel outlet flows as noted hereinabove.

Embodiments of the current invention further include the capabilities of modifying the speed and air flow of respective propellors of outlet air flow-enhancing devices 40. Additionally, as noted hereinabove with regard to outlet air flow-enhancing device 20, the attitude and positioning of propellors of outlet air flow-enhancing device 40 may be changed to enable optimal operation, mutatis mutandis.

It will be appreciated that the above descriptions are intended only to serve as examples, and that many other embodiments are possible within the scope of the present invention and as defined in the appended claims.

The invention claimed is:

1. In a vehicle having exterior contours and shape and an incoming wind entering a central air main inlet and two front-side air opening inlets, and exiting respectively as a hood air opening outlet air flow and two lateral-wheel outlet flows, an engineering apparatus to affect airflow and to enhance vehicle performance, the apparatus having:
   at least one outlet air flow-enhancing device configured to enhance and modify the hood air outlet opening and the two lateral-wheel outlet flows, the at least one outlet air flow enhancing device having an x-axis, a y-axis, and a z-axis, the axes mutually orthogonally oriented; and
   a mechanical fixture of the at least one outlet air flow-enhancing device to the vehicle, the mechanical fixture having movable supports configured to allow changes in attitude and positioning of the at least one outlet air flow enhancing device;
   wherein the hood air outlet opening and the two lateral-wheel outlet flows are affected by aerodynamic changes to the vehicle by not directly affecting changes in the exterior contours and shape of the vehicle.

2. The apparatus according to claim 1, wherein the at least one outlet air flow-enhancing device has an air-turbine configuration with a front end and a rear end.

3. The apparatus according to claim 2, wherein the wind enters the front end and is thrust out of the rear end, substantially coaxially with the x-axis.

4. The apparatus according to claim 3, wherein the at least one outlet air flow-enhancing device is powered electrically.

5. The apparatus according to claim 4, wherein an estimated preferred weight of the outlet air flow-enhancing device ranges from 22 to 27 kilograms.

6. The apparatus according to claim 1, wherein the at least one outlet air flow enhancing device includes a drive shaft connected to and configured to drive a propeller, the drive shaft mechanically connected and driven by a drive gear apparatus, supported by and rotated upon a support shaft.

7. The apparatus according to claim 6, wherein the drive gear apparatus is driven by a front wheel drive system, which includes: a front wheel axle drive and support shaft; at least one front wheel drive gear apparatus driven by the front wheel axle drive and support shaft; a drive belt driven by the front wheel axle drive and support shaft; and a forward gear apparatus driven by the drive belt.

8. The apparatus according to claim 7, wherein the drive belt is a belt, fabricated from a combination of fiber and strong, flexible material.

9. The apparatus according to claim 8, wherein the drive belt has a reinforced chain structure.

10. The apparatus according to claim 9, wherein the drive belt is configured to transfer rotational movement of the front wheel gear apparatus to rotate the forward gear apparatus.

11. The apparatus according to claim 10, wherein the forward gear apparatus is configured to mesh and to drive the drive gear apparatus, thereby providing rotational movement of the propellor.

12. The apparatus according to claim 11, wherein a forward support system is mounted mechanically to the vehicle, the forward support system including: a forward horizontal support shaft; and at least one forward "T" coupling configured to support the drive gear apparatus.

13. The apparatus according to claim 12, wherein the forward horizontal support shaft is further configured to mechanically support the forward gear apparatus.

14. The apparatus according to claim 13, wherein at least one additional outlet air flow enhancing device is configured to be driven by the forward gear apparatus.

15. The apparatus according to claim 14, wherein an estimated preferred weight of the outlet air flow-enhancing device ranges from 22 to 27 kilograms.

\* \* \* \* \*